US006675541B2

(12) United States Patent
Mackey

(10) Patent No.: US 6,675,541 B2
(45) Date of Patent: *Jan. 13, 2004

(54) METHOD AND APPARATUS FOR APPLYING EDGE MEMBERS TO A WINDOW

(75) Inventor: Donald A. Mackey, Bairdford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/219,847

(22) Filed: Aug. 15, 2002

(65) Prior Publication Data

US 2002/0189068 A1 Dec. 19, 2002

Related U.S. Application Data

(62) Division of application No. 08/989,336, filed on Dec. 11, 1997, now Pat. No. 6,467,232.

(51) Int. Cl.[7] .................................................. B25B 1/20
(52) U.S. Cl. .......................... 52/208; 52/204.1; 269/40
(58) Field of Search ........................ 29/281.5, 281.1; 269/296, 303, 40; 52/208, 204.1, 204.5

(56) References Cited

U.S. PATENT DOCUMENTS

| 1,432,396 A | 10/1922 | Hurley |
| 3,028,638 A | 4/1962 | Goellner ........................ 20/11 |
| 3,282,014 A | 11/1966 | Bamford et al. ............... 52/627 |
| 3,383,823 A | 5/1968 | Bono, Jr. ....................... 52/716 |
| 3,593,963 A | 7/1971 | Horgan, Jr. ................... 256/24 |
| 3,938,291 A | 2/1976 | Criswell ....................... 52/731 |
| 3,978,633 A | 9/1976 | Scheidler et al. ............. 52/400 |
| 3,989,233 A * | 11/1976 | Wardell, Jr. .................. 269/296 |
| 4,173,461 A * | 11/1979 | Ebata et al. .................... 65/106 |
| 4,418,956 A | 12/1983 | Yamamoto et al. .......... 296/126 |
| 4,495,023 A * | 1/1985 | Lisec ........................... 156/562 |
| 4,662,113 A | 5/1987 | Weaver ........................ 49/404 |
| 4,695,499 A | 9/1987 | Whitener ..................... 428/122 |
| 4,708,678 A * | 11/1987 | Tischer et al. ................ 445/24 |
| 4,765,673 A | 8/1988 | Frabotta et al. ............... 296/93 |
| 4,834,931 A | 5/1989 | Weaver ....................... 264/252 |
| 4,837,127 A | 6/1989 | Ohara et al. ................. 430/270 |
| 4,914,888 A | 4/1990 | Hanson ........................ 52/768 |
| 4,943,179 A | 7/1990 | Horiki ........................ 403/269 |
| 5,035,046 A * | 7/1991 | Cowing ........................ 29/714 |
| 5,093,177 A * | 3/1992 | Anderson et al. ............. 428/81 |
| 5,226,259 A | 7/1993 | Yamagata et al. ............ 49/502 |
| 5,249,343 A * | 10/1993 | Grosso et al. .............. 29/281.4 |
| 5,305,992 A * | 4/1994 | Kish ............................ 269/51 |
| 6,467,232 B1 | 10/2002 | Mackey ...................... 52/716.5 |
| 6,497,025 B1 * | 12/2002 | Bohannan et al. ......... 29/281.5 |

OTHER PUBLICATIONS

U.S. patent application Ser. No. 08/989,336 filed Dec. 11, 1997, now U.S. Pat. No. 6,467,232 (included above).

* cited by examiner

Primary Examiner—Carl D. Friedman
Assistant Examiner—Basil Katcheves
(74) Attorney, Agent, or Firm—Andrew C. Siminerio

(57) ABSTRACT

A fixture for and method of positioning an edge member on a sheet is provided. The fixture includes a base, an arrangement to locate a sheet to be supported on the fixture at a predetermined position relative to a plurality of datum points; and an arrangement to position an edge member to be secured along a peripheral edge of the sheet at a desired position relative to the datum points. In one particular embodiment of the invention, a plurality of alignment stops are positioned to contact selected peripheral edges of the sheet while the sheet is supported on support posts to position and orient the window at a predetermined position relative to the datum points.

12 Claims, 3 Drawing Sheets

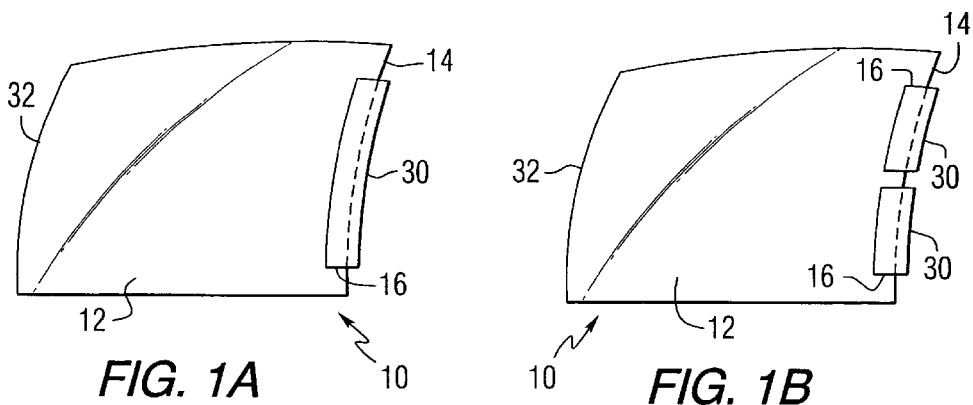
FIG. 1A  FIG. 1B
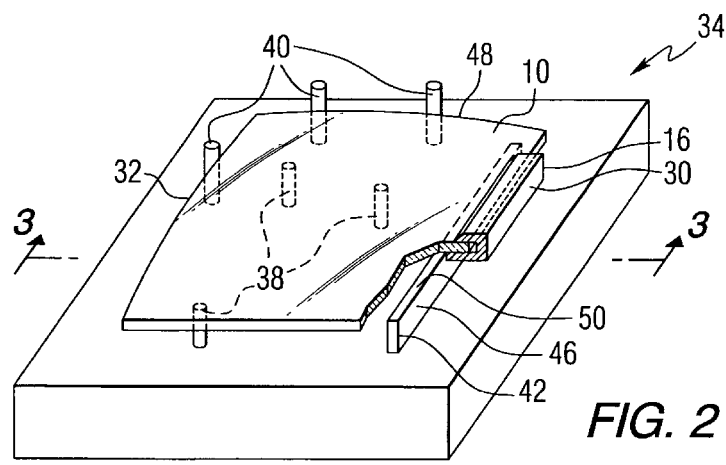
FIG. 2
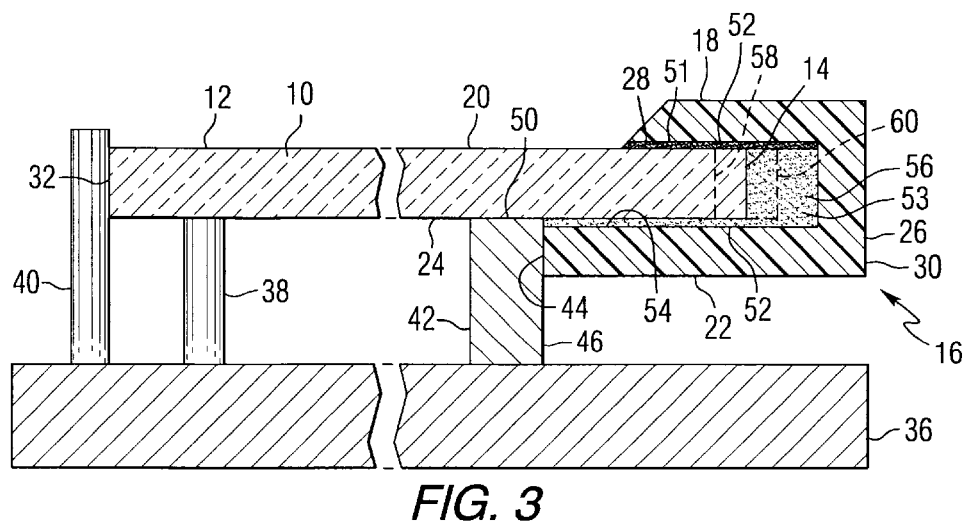
FIG. 3

METHOD AND APPARATUS FOR APPLYING EDGE MEMBERS TO A WINDOW

This is a divisional of U.S. patent application Ser. No. 08/989,336 filed on Dec. 11, 1997, now U.S. Pat. No. 6,467,232 which issued on Oct. 22, 2002.

BACKGROUND OF THE INVENTION

1. Field of the Invention

This invention relates to positioning structures on the edge of a sheet and, in particular, to securing edge members to a vehicle window in a manner that ensures proper overall sizing of the vehicle window.

2. Technical Considerations and Prior Art

Automotive windows are often provided with edge attachments or other various types of members secured along selected edges of the window. These members may be molded directly on the glass, e.g. as disclosed in U.S. Pat. Nos. 4,837,127 and 4,662,113 to Weaver. More specifically, the glass may be positioned in a mold system where the members are formed directly on and bonded to the marginal edge of the window. This type of operation, often referred to as encapsulation or reaction injection molding, is expensive and time-consuming. As an alternative, pre-formed members may be seated against the edge of the window and secured in place by an adhesive, e.g. as disclosed in U.S. Pat. No. 4,943,179 to Hiriki, et al. and U.S. Pat. No. 5,226,259 to Yamagata, et al. The problem faced with this type of arrangement is the accuracy and consistency of the overall dimensions of the window. More specifically, since the edge of the window is used as a guide for the edge member, if the edge dimension is incorrect, after the member has been secured to the window, the overall dimensions of the window will be incorrect. This may pose a problem when the member is used as a window guide, e.g. for a reciprocating door window, or requires precise positioning based on peripheral dimensions of the window, e.g. to seal the window against the vehicle body.

It would be advantageous to provide an arrangement for securing edge members to a vehicle window which ensures that the completed window assembly has the desired overall dimensions.

SUMMARY OF THE INVENTION

The present invention provides a fixture for positioning an edge member on a sheet. The fixture includes a base, an arrangement to locate a sheet to be supported on the fixture at a predetermined position relative to a plurality of datum points, and an arrangement to position an edge member to be secured along a peripheral edge of the sheet at a desired position relative to the datum points. In one particular embodiment of the invention, alignment stops are positioned to contact selected peripheral edges of the sheet while the sheet is supported on support posts to position and orient the sheet at a predetermined position relative to the datum points. The positioning arrangement may include a guide spaced from the peripheral edge of the sheet and placed at a predetermined location relative to the datum points such that edge members contacting the guide are at the desired position relative to the datum points.

The present invention also provides a method of mounting an edge member to a sheet, including the steps of establishing datum points, positioning a sheet relative to the datum points, and securing an edge member to a marginal edge of the sheet such that a base section of the edge member is spaced from a corresponding peripheral edge of the sheet and the edge member is at a desired position relative to the datum points. In one particular embodiment of the invention, stop members are located at the datum points, and the sheet is positioned by moving selected peripheral edges of the sheet into contact with the stop members and the edge members may be positioned at their desired position by locating the edge members on the sheet relative to a guide arrangement.

The present invention further provides window assembly comprised of a shaped glass sheet having a peripheral edge, and an edge member secured to the sheet along the peripheral edge, wherein the edge member includes at least one leg member extending along a portion of a major surface of the sheet and a base section spaced from the peripheral edge of the sheet.

BRIEF DESCRIPTION OF THE DRAWINGS

FIG. 1A illustrates a window assembly having an edge member positioned along one edge of the window.

FIG. 1B illustrates a window assembly having edge members positioned along one edge of the window.

FIG. 2 is a partial cut-away, perspective view of a fixture incorporating features of the present invention, with portions removed for clarity.

FIG. 3 is a view taken along line 3—3 of FIG. 2 illustrating the edge of window assembly with an edge member.

DETAILED DESCRIPTION OF THE INVENTION

Figure 4:
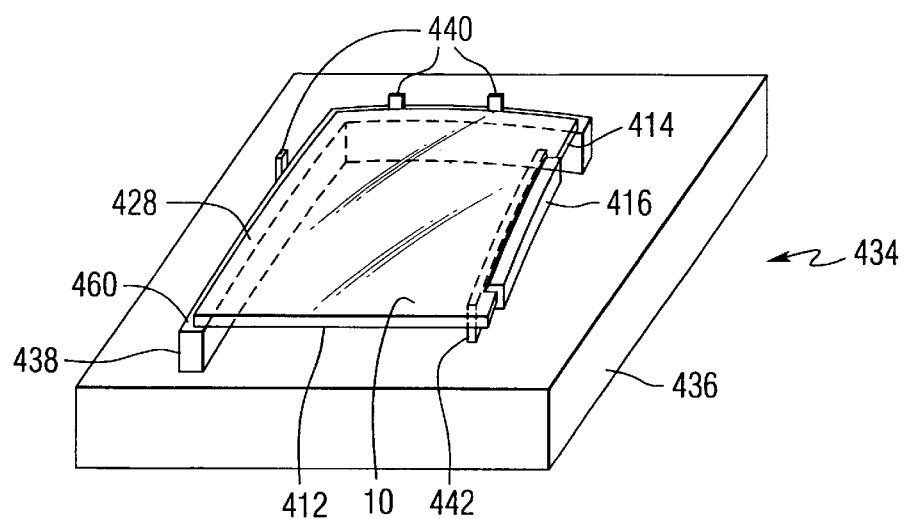
FIG. 4 is a view similar to FIG. 2 illustrating an alternate embodiment of the present invention.

The instant invention is presented in combination with securing members along the edge of a vehicle window, but it should be appreciated that the present invention may be used in combination with other systems where the overall size of a substrate with an edge member is important.

FIG. 1 illustrates a glass window assembly 10 for a motor vehicle which includes a window 12 that is shaped in any convenient manner to a desired curvature which matches the contours of the vehicle body into which the window assembly 10 is installed. Although not required, the window is preferably constructed of glass, polycarbonate, and/or other transparent materials. Secured to the window 12 along peripheral edge 14 is a pre-formed edge member 16. As used herein, the term "edge member" includes any structure secured to a window and extending along at least a portion of the window's peripheral edge. Such edge members 16 are typically used to attach additional hardware to the window, e.g. window regulators, or as a window guide, or as a sealing member for the window assembly 10. It is contemplated that member 16 may be formed by any of a number of different fabrication techniques well known in the art, e.g. casting, stamping, machining, injection molding, extrusion, or a combination of these processes, and may be either rigid or flexible. Although FIG. 1 shows only one member 16, it should be appreciated that a member may be secured along any or all of the window's peripheral edges. The member 16 may be made from rubber, reinforced plastic, aluminum or other materials known to those skilled in the art. Although not limiting in the present invention, in the particular window assembly 10 illustrated in FIGS. 2 and 3, the member 16 is a "C"-shaped member with an outer leg 18 which extends over the outer major surface 20 of the window 12, an inner leg 22 which extends over the inner major surface 24 of the window 12, and a base section 26 which is spaced form the edge 14, as will be discussed later in more detail.

Generally when a pre-formed edge member is secured to a window 12, typically the edge 14 of the window 12 is used as a positioning guide for the member. More specifically, the member is positioned to capture a portion of the marginal edge 28 of the window 12 and is pushed onto the window until the window edge 14 is seated against the base of the member. Where the overall dimensions of the window assembly 10 are critical, variations in the dimensions of the window 12 may result in oversizing or undersizing of the window assembly 10 which in turn may affect the operation of the window. For example, where the window assembly 10 is a reciprocating window and the edge member is a guide that fits within a slide assembly of a vehicle door, the guide may jam and bind the window if the overall dimensions of the window assembly are not as required.

To overcome this problem and provide consistent overall dimensional accuracy of the window assembly, the present invention provides an arrangement which ensures that a window assembly with edge members has the desired overall dimensions. More specifically, for example with respect to the particular window assembly 10 illustrated in FIG. 1, the present invention provides the required dimensions from edge 30 of member 16 to opposing edge 32, regardless of any dimensional variations or inaccuracies between edges 14 and 32 of window 12. To this end the present invention establishes a datum scheme, i.e. a series of reference points, and the window 12 and edge member 16 are located relative to these reference points to ensure overall dimensional accuracy of the window assembly 10 as shown for window assemblies 10 of FIGS. 1 through 7. Although not limiting in the present invention, in the embodiment of the present invention illustrated in FIGS. 2 and 3, a fixture 34 has a base 36 with support posts 38 and alignment stops 40. Posts 38 provide support for the window 12 and alignment stops 40 establish datum points to position the window 12 at a desired position and orientation on the fixture 34, as will be discussed later in more detail. Fixture 34 further includes a guide 42 positioned at a predetermined location relative to the reference points established by the alignment stops 40. Although not limiting in the present invention, in the particular embodiment illustrated in FIGS. 2 and 3, guide 42 is positioned inboard and below window 12 along inner surface 24 and extends along a majority of window edge 14. Guide 42 is configured such that when the member 16 is being positioned along the portion of the marginal edge 28 corresponding to peripheral edge 14 of window 12 while supported on the fixture 34, inner edge 44 of inner leg 22 will contact surface 46 of guide 42 and prevent base section 26 of member 16 from being seated against edge 14 of window 12, as will be discussed later in more detail. In this manner, by setting the distance from the inner edge 44 of leg 22 to the outer edge 30 and positioning the guide 42 the corresponding desired distance from the reference points established by alignment stops 40, the distance from window edge 32 (which location is set at the datum points by stops 40) to the outer edge 30 of member 16 (which location is set by guide 42) is established, independent of the window edge 14. As a result the overall dimensions of the window assembly 10 does not vary with variations in the dimensions of edge 14.

It should be appreciated that the window 12 may be positioned on fixture 34 relative to the reference points without using alignment stops 40. For example, the window 12 may be aligned on the support posts 38 using a vision system (not shown), as is known in the art, which incorporates light beams and/or cameras to recognize portions of the window, such as selected peripheral edges, and properly position the window relative to the reference points. A robot (not shown) or other handling device known in the art may be used to move the window into place.

To secure the member 16 onto the window 12, the window 12 is first positioned per the desired datum scheme, which, in the particular embodiment of the invention discussed above, includes positioning the window 12 on the support posts 38 with selected peripheral edges of the window 12, e.g. edges 32 and 48, contacting the alignment stops 40. When positioned on the fixture 34, a portion of the window 12 will extend over the guide 42. If desired, surface 50 of the guide 42 may be contoured to generally correspond to the elevation configuration of the overlying portion of the supported window 12 and provide additional window support. An adhesive 52 is applied to member 16, e.g. along inner surface 54 of leg 22, and member 16 is pressed onto the marginal edge 28 of window 12 until edge 44 of leg 22 contacts surface 46 of guide 42. Any excess adhesive 52 is collected in the space 56 between the window edge 14 and base section 26 of member 16. It is expected that when the edge member 16 is positioned along an edge of the window opposite from the edge contacting the stops 40, the stops 40 will hold the window 12 in place while the edge member 16 is moved to its desired position. However, in arrangements where stops cannot be used to hold the window in place, additional devices may be used to hold an aligned window on fixture 34, e.g. clamps or a vacuum stand as is known in the art.

It should be appreciated that although guide 42 in FIG. 2 provides a continuous surface 46 to contact edge 44 of leg 22 of member 16, this arrangement may be replaced with a plurality of posts (not shown) positioned a desired distance from the reference points on the fixture 34 to control the positioning of member 16 on window edge 14. Furthermore, if member 16 is made of a rigid material that allows for very little flexing of the member, it is believed that only two guide posts would be required to properly position the member 16 on the window edge 16. In addition, it should be further appreciated that in a window assembly 10 where an edge member is secured along the same edge that contacts the stops 40, this may be accomplished by positioning the stops 40 so that edge member 16 avoids the stops 40, or by moving the stops 40 away for the window edge after positioning and orienting the window 12 on fixture 34, as will be discussed later in more detail.

As discussed earlier, the present invention allows for dimensional variations in the edges of the window 12. More specifically, dotted lines 58 and 60 in FIG. 3 show the minimum and maximum expected dimensions of the edge 14 of the window 12, as set by the tolerances of the glass sheet cutting equipment. As can be seen, the member 16 is designed so as to account for variations in the window's edge dimensions and still provide for proper positioning of member 16, and thus edge 30, relative to the guide 42 by maintaining base section 26 of edge member 16 spaced from edge 14, regardless of whether the edge 14 is at its minimum or maximum dimension. If desired, the size of window 12 may be such that when edge 14 is at its maximum dimension, i.e. at line 60, it will be contacted by base 26 of edge member 16. It should be appreciated that sufficient adhesive 52 should be applied to the member 16 to ensure proper adhesion along the marginal edge 28 when the window 12 is undersized, i.e. edge 14 is at line 58, and legs 18 and 22 have minimal overlap of the window's major surfaces, 20 and 24, respectively. If desired, adhesive 52 may be also applied along the inner surface of leg 18 as well as leg 22 to further secure the member 16 to the window 12. Although not limiting in the present invention, materials such as thermal set plastics, hot-melt epoxies, methyl acrylics and urethanes may be used as the adhesive, and if desired, a primer may also be used. In one particular embodiment of the invention, the adhesive 52 is BETASEAL® U216 urethane, available from Essex Specialty Products, Auburn Hills, Mich. In addition, when using this adhesive for this application, it is preferred that a primer 51 be applied to the glass surface which will contact the adhesive. More specifically, Essex Specialty Products' BETASEAL® 435.18 clear primer is applied to the marginal edge 28 of glass surface 24 which is covered by leg 22 and subsequently BEATSEAL® 435.20A black colored primer is applied over the clear primer.

As an alternative to simply supporting the window on posts as discussed earlier, the fixture may include an arrangement which allows the fixture to be used as a check fixture, i.e. a fixture used to check the conformance of the window to the desired shape along selected marginal edges. More specifically, referring to FIG. 4, a fixture 434 includes a base 436 with an elevated ledge 438 that generally corresponds to the periphery of selected edges of a window 412. The surface 460 of the ledge 438 corresponds to the desired elevational contour of selected portions of the marginal edge 428 of the window 412. A plurality of alignment stops 440 are positioned on the fixture 434 at desired reference points to correctly position of the window 412 relative to the ledge 438 when the window 412 is positioned on the fixture 434 and establish the datum scheme. In practice, to check the elevational contour of the window 412, the shaped window is placed on the fixture 434, with selected edges positioned against the stops 440, so that selected marginal edges of the window 412 are supported on the corresponding portions of the ledge 438. A gauge (not shown) may then be inserted between the downwardly facing surface of the window 412 and the ledge surface 460 to determine how closely the marginal edge of the window 412 matches the desired elevational contour. Guide 442 is positioned on base 436 at a predetermined location relative to stops 440 as discussed earlier with respect to guide 42, to correctly position member 416 on the marginal edge similar to but opposite the marginal edge 428 of the window 412 without using peripheral edge 414 of the window 412 as a guide.

It should be appreciated that the present invention is not limited to securing a single member to only a single edge of the window. More specifically, the window may be supported and positioned on a fixture to allow application of a plurality of edge members along desired window edges, as well as framing the entire window with edge members.

Figure 5:
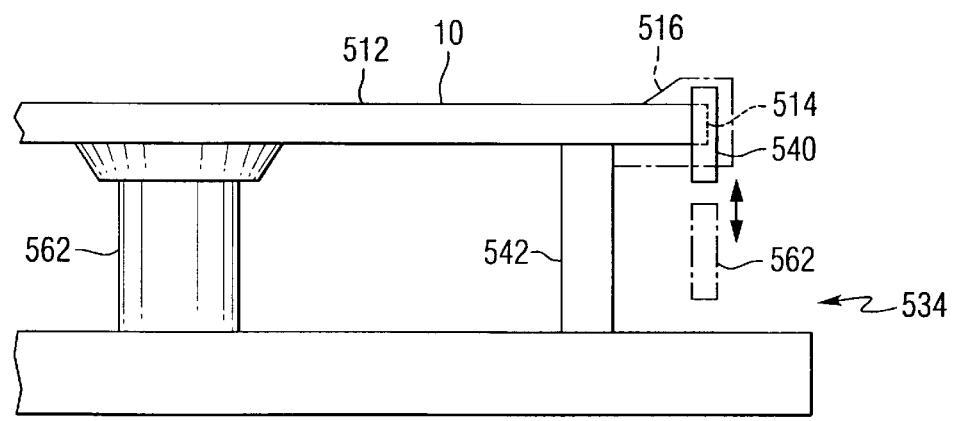
FIG. 5 is an end view illustrating an alternate embodiment of the present invention.

As discussed earlier, if an edge member, as indicated by dotted line 516 in FIG. 5, is to be positioned along an edge 514 of window 512 where alignment stops 540 are located (only one stop shown in FIG. 5), the stops may be designed to move from a first position, wherein the stops 540 are contacted by selected peripheral edges of window 512, to a second position, wherein the stops 540 are spaced from the window edge, as indicated by dotted line 560. The movement of stops 540 may be accomplished by lowering the stops as shown in FIG. 5, or rotating the stops, or by any other arrangement well known in the art. In addition, the fixture 534 may include an arrangement to hold the window 512 in place after stops 540 are moved to their second position to maintain the position of sheet 512 while the members 516 (only one shown in FIG. 5) are moved into contact with guides 542 (only one shown in FIG. 5) and secured to the window 512 in the manner as discussed earlier. Although not limiting in the present invention, a vacuum stand 562, of a type well known in the art, may be used to support and hold an aligned window 512 by drawing a vacuum along a portion of the window surface of a positioned and oriented window to allow the alignment stops 540 to move to their second position 560.

Figure 6:
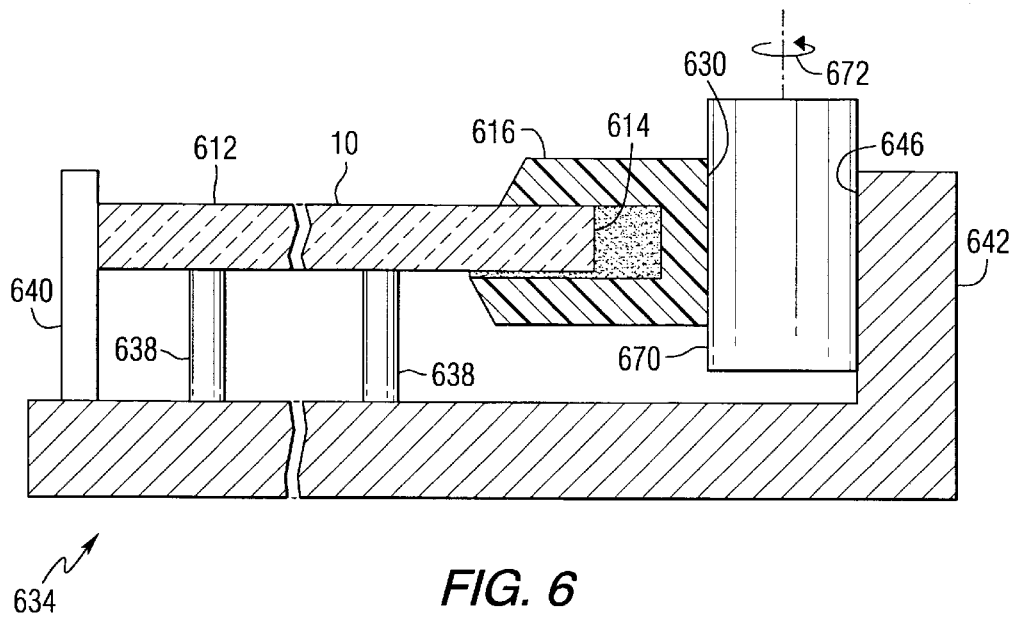
FIGS. 6 and 7 are views similar to FIG. 3 illustrating alternates embodiment of the present invention.

FIG. 6 illustrates an alternate embodiment wherein a guide is positioned at a location spaced from the window. More specifically, window 612 is supported on support posts 638 and positioned at a desired reference location via alignment stops 640. Guide 642 is positioned outboard of window edge 614 such that surface 646 of guide 642 is a predetermined distance from the desired location of edge 630 of an edge member 616 which is established by the alignment stops 640. After initially positioning member 616 along edge 614 of window 612 and positioning the window 612 on the fixture 634, a spacer 670 is positioned between and in contact with both surface 646 of guide 642 and edge 630 of member 616. The spacer is sized such that when it placed between the guide 642 and member 616, the portion of edge 630 corresponding to the portion of edge member 616 in contact with the spacer 670 is properly positioned on the window 612 relative the datum points established by alignment stops 640. Although not limiting in the present invention, the spacer 670 may be a discrete member that is moved along surface 646 in order to properly position member 616, as shown in FIG. 6, or it may be a continuous member that extends along at least a substantial portion of edge member 616. In the former embodiment, the spacer may be a sliding or rolling assembly, e.g. a roller head that rotates as indicated by numeral 672, and slides along surface 646 in order to properly position the member 616.

Figure 7:
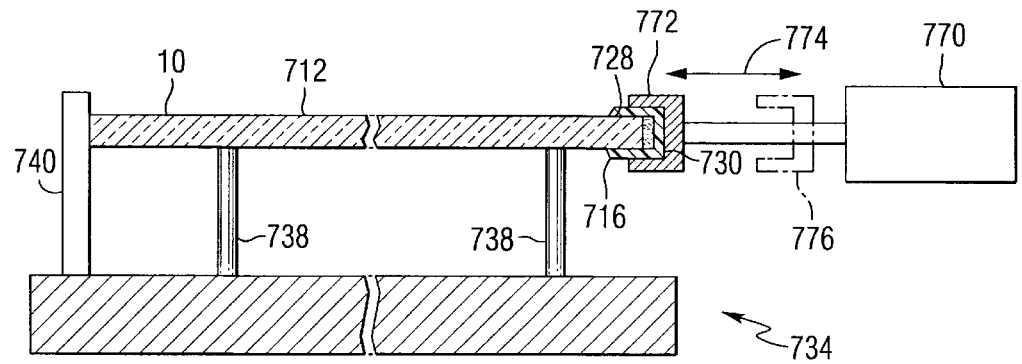

It is further contemplated in the present invention that the datum scheme not require the edge member to contact a guide 42 as illustrated in FIGS. 2 and 3, or a guide 642 as illustrated in FIG. 6 in order to prevent the member 16 from being seated directly against the edge 14 and ensure the proper positioning of the member 16 on window edge 14. FIG. 7 illustrates a positioning arrangement whereby support posts 738 support window 712 on fixture 734 while alignment stops 740 position the sheet 712 at a desired reference position. Adhesive is applied to edge member 716 which in turn is positioned at a first position along marginal edge 728 of window 712. While at the first position, edge member 716 is supported on the window 712 but is not at its final desired location. A positioner 770 (only one shown in FIG. 7) having a head 772 then moves the head 772 as indicated by arrow 774 from a first position indicated by dotted line 776, wherein head 772 is spaced from edge member 716, to a second position wherein head 772 contacts edge member 716 and presses the member 716 on the window 712 and positions the member 716 at the desired location relative to the datum points. The positioner 770 may be any type of mechanical or electromechanical device capable of moving head 772 between the first and second positions, such as but not limited to an air cylinder or linear slide. Although not required, in the particular embodiment illustrated in FIG. 7, head 772 is configured such that the portion of the head 772 which contacts edge member 716 compliments the edge member. The stroke of the positioner 770 is controlled such that edge 730 of the edge member 716 is properly positioned on the window 712 and the overall dimensions of the window 712 are correct. It should be appreciated the positioning of the member 716 by positioner 770 may be accomplished by using multiple actuators positioned along the length of the member 716 or by a single actuator with a head 772 that is large enough to engage and properly position the member 716 in the window 712. It is contemplated that rather than use a positioner 770 mounted on a fixture, a robot (not shown) may be used to apply the members 16 to the window 12. More specifically, once the window 12 is aligned on the fixture and held in place, a programmed robot may properly press each member 16 along an edge of the window 12 to a predetermined position on the window 12 to ensure that the overall dimensions of the window assembly 10 are correct.

As an alternative to preliminarily positioning an edge member on the window and using a positioner to push the member into place as shown in FIG. 7 and discussed above, it is contemplated that the positioner may be used to both place and position the edge member. More specifically, the head of the positioner would initially support the edge member at a first position spaced from the edge of the window. The positioner would then be activated to move the head towards the window to a second position to mount and position the edge member at the desired location relative to the datum points.

It should be appreciated that edge members having shapes other than that shown for member 16 may be positioned along a window edge 14 using the teachings of the present invention. For example, depending on the arrangement used to position the edge member 16 on window 12, leg 18 or 22 may be eliminated so that the edge member has an "L"-shaped configuration. If desired, the exposed space between the edge 14 of the window 12 and the base of the edge member may be filled with a filler material 53, e.g. urethane.

The invention described and illustrated herein represents an illustrative preferred embodiment thereof. It is understood that various changes may be made without departing from the scope of the invention as defined by the claims that follow.

I claim:

1. A fixture for positioning an edge member on a sheet, comprising:
    a base;
    means to locate a sheet to be supported on said fixture at a predetermined position relative to a plurality of datum points; and
    means to position an edge member to be secured along a peripheral edge of said sheet at a desired position relative to said datum points.

2. The fixture as in claim 1 further including at least one support secured to said base to support said sheet at said predetermined position.

3. The fixture as in claim 2 wherein said at least one support includes a plurality of posts positioned to contact said sheet inboard of said peripheral edge of said sheet.

4. The fixture as in claim 2 wherein said at least one support includes a ledge having a sheet supporting surface generally corresponding to selected marginal edge portions of said sheet.

5. The fixture as in claim 2 wherein said locating means include a plurality of alignment stops positioned to contact selected peripheral edges of said sheet while supported on said at least one support such that said sheet is at said predetermined position relative to said datum points.

6. The fixture as in claim 5 wherein said stops are moveable from a first position, wherein said stops contact said selected peripheral edges of said sheet to a second position wherein said stops are spaced from said peripheral edges of said sheet.

7. The fixture as in claim 2 wherein said positioning means includes a guide spaced from said peripheral edge of said sheet and placed at a predetermined location relative to said datum points such that edge members contacting said guide are at said desired position relative to said datum points.

8. The fixture as in claim 7 wherein said guide is positioned inboard of said peripheral edge of said sheet.

9. The fixture as in claim 8 wherein said guide includes a sheet supporting surface generally corresponding to a selected marginal edge portion of said sheet.

10. The fixture as in claim 2 wherein said positioning means includes a guide positioned outboard of said peripheral edge of said sheet and further including a spacer member positionable between said guide and said edge member such that when said spacer member is positioned between and contacts both said guide and edge member, portions of said edge member in contact with said spacer are positioned at said desired position on said sheet relative to said datum points.

11. The fixture as in claim 2 wherein said positioning means includes a positioner with a head member, wherein said positioner moves said head member a first position, where said head member is spaced from an edge member positioned along said peripheral edge of said sheet, to a second position, where said head member contacts and moves said edge member positioned along said peripheral edge of said sheet to said desired position relative to said datum points.

12. The fixture as in claim 2 wherein said positioning means includes a positioner with an edge member head member, wherein said positioner moves said head member between first position, where said head member and edge member are spaced from said peripheral edge of said sheet, to a second position, where said head member positions said edge member onto said peripheral edge of said sheet at said desired position relative to said datum points.

* * * * *